(12) United States Patent
Klein et al.

(10) Patent No.: US 6,371,051 B1
(45) Date of Patent: Apr. 16, 2002

(54) SHELLFISH EVALUATION

(75) Inventors: Kenneth Klein, Mount Pearl; Jacques Guigné; Quanshun Liu, both of Paradise; Richard Cawthorn, Cornwall, all of (CA)

(73) Assignee: Guigne International, Ltd., Paradise (CA)

( * ) Notice: Subject to any disclaimer, the term of this patent is extended or adjusted under 35 U.S.C. 154(b) by 0 days.

(21) Appl. No.: 09/907,236

(22) Filed: Jul. 16, 2001

(51) Int. Cl.$^7$ ............................................... A01K 61/00
(52) U.S. Cl. ...................................................... 119/200
(58) Field of Search ................................. 119/200, 201, 119/215, 204, 213, 216, 234

(56) References Cited

U.S. PATENT DOCUMENTS

| | | | | |
|---|---|---|---|---|
| 4,646,276 A | * | 2/1987 | Kowalewski et al. | 367/139 |
| 5,099,455 A | * | 3/1992 | Parra | 367/120 |
| 5,168,473 A | * | 12/1992 | Parra | 367/124 |
| 5,854,447 A | * | 12/1998 | Greenwood et al. | 177/25.14 |

* cited by examiner

Primary Examiner—Thomas Price
(74) Attorney, Agent, or Firm—Leon D. Rosen

(57) ABSTRACT

A method and apparatus for evaluating a live shellfish (S), especially a lobster or crab, to determine the MC, or meat ratio (meat divided by meat plus water). A pair of transducer devices (12, 14) are pressed against opposite sides of the shell of a live shellfish to determine the velocity of sound through it. The transducer devices are pressed without substantially deforming or cracking the shell, to avoid injury to the shellfish. Good acoustic coupling to the shell is achieved by applying a sound-transmitting gel (240, 242) to the face of each transducer device. If the velocity 1560 m/sec, this indicates an MC of 7%, indicating that the shellfish is unsuitable for harvest. If the velocity 1660 m/sec. then this indicates an MC of 19%, which indicates that the shellfish is ready for harvesting, that is, for shipping to restaurants or markets for human consumption. A velocity of 1600 m/sec. indicates an MC of 12% which is about a borderline between acceptance and rejection.

17 Claims, 3 Drawing Sheets

SHELLFISH EVALUATION

BACKGROUND OF THE INVENTION

Eatable shellfish such as lobsters and crabs, consist primarily of water and meat. The ratio MC is the ratio of meat to water plus meat by weight. When the MC of a lobster or crab is at least about 19%, this indicates that the lobster or crab is ready for harvesting. That is, that the lobster or crab can be shipped to a market for later human consumption. When the MC is no more than about 7%, this indicates that the lobster or crab is not in a condition for shipment to a market. In most cases, such a low percent of meat is due to the animal having just completed molting (recently having shed its shell and grown a larger shell) or being diseased. When the shellfish are being raised in seafood farming, it is generally desirable to release the animal, so a molting animal can recover and a diseased animal can recover or die. Although lobsters, crabs, and other shellfish often can be correctly evaluated by color, weight, and other characteristics by an experienced shellfish handler, it would be desirable if a more accurate and/or objective evaluation of a shellfish could be obtained, and if this could be done by a less experienced person.

The prior art suggests the use of the velocity of sound through large farm or ranch animals such as cattle and sheep, to determine the amount of fat in the animal, and it has been speculated that such velocity measurements might be useful for a wide range of animals. However, the structure of shellfish is very different from that of cattle and sheep. That is, for shellfish, a major question is whether the animal should be harvested or put back, based upon the percent of meat to total body mass which is substantially equal to meat plus water.

When sonic energy is transmitted through a cow or sheep, this can be done by pressing the faces of transducer devices against a pinched portion of the animal with sufficient force to assure that the transducer faces make wide area contact with the animal. However, with a shellfish, the shell is rigid and the face of the transducer device cannot be made to assure contact with a wide area of most shellfish. A large force against the shell will crack it, resulting in the early death of a shellfish. A method and apparatus for readily determining the meat ratio, or MC, in a live shellfish without injuring the shellfish, would be of value.

SUMMARY OF THE INVENTION

In accordance with one embodiment of the present invention, a method and apparatus are provided for detecting MC, which is the ratio of meat to meat plus water in a shellfish, especially in a lobster or crab. This is accomplished by pressing a pair of transducer devices against opposite locations of the shell of the shellfish, without substantially deforming or cracking the shell, and measuring the velocity of sound between those locations. A sound-carrying flowable material, especially a gel, is preferably applied to lie between the face of each transducer device and a corresponding location on the shellfish, to provide good acoustic coupling without excessive pressure that would crack the shell of the shellfish.

Shortly (the same day) before the faces of the transducer devices are pressed against locations on the shellfish, the apparatus is calibrated to determine the velocity of sound between the faces. This enables calibration of the apparatus for particular parameters including temperature and the present state of the electronic circuitry. After the period of time required for sound to pass between the transducers is determined for zero spacing of the faces, the faces of the transducer devices are moved apart and then pressed against opposite locations on the shellfish and a measurement is taken.

At least ¾ths of the time, a shellfish is harvested for transport to market and human consumption when the velocity of sound through the shellfish is at least 1660 m/sec. At least ¾ths of the time, the shellfish is not harvested for transport and human consumption when the velocity of sound through the shellfish is less than 1560 m/sec. A velocity of 1660 m/sec. has been determined to indicate 19% meat ratio, while a velocity of 1560 m/sec. indicates 7% meat ratio, for both a lobster and a crab. A velocity of about 1600 m/sec, which indicates a 12% meat ratio is a borderline between harvesting or not.

A horn lies between each transducer and the shell of a shellfish, to provide a time delay so the entire pulse can leave the transducer before reflected energy reaches the transmitting transducer.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
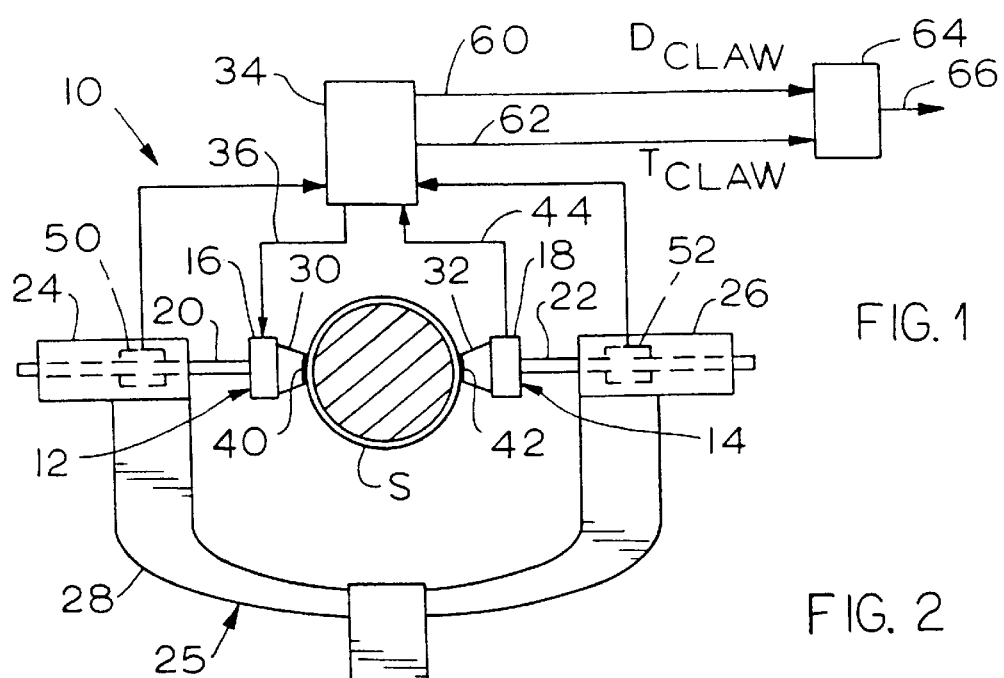
FIG. 1 is a front elevation view and partial block diagram of apparatus of the invention for evaluating a shellfish by determining the ratio of meat to body mass.

FIG. 1 illustrates apparatus 10 for evaluating the condition of a shellfish S, particularly a lobster or crab, with the part S being the crusher claw of a lobster. The apparatus includes first and second acoustic transducer devices 12, 14 that each includes an acoustic transducer 16, 18, a rod 20, 22 that supports the transducers and a horn 30, 32. Applicant uses solid transmission lines as horns. A holder 25 supports the transducer devices. The rods of the transducer devices slide within ends 24, 26 of a holder base 28 to enable the transducers to be moved toward and away from the shellfish. Of course, it is only necessary to make one of the transducer devices movable while the other can be fixed in position.

A first circuit 34 generates an electrical signal such as a pulse on output line 36, which is connected to the first transducer 16 to cause the first transducer to generate acoustic energy. The acoustic energy passes through the horn 30 to a location 40 at the first side of the shellfish, and in a largely straight path through the shellfish to the second side location 42, and through the second horn 32 to the second transducer 18. The second transducer 18 generates an electrical signal on line 44 which is delivered to the first circuit 34. By determining the time of transition of the sound, the separation between the transducer devices, and a previous calibration, the apparatus can determine the velocity of sound through the shellfish. The velocity of sound closely correlates to the MC, or percent of meat to meat plus water of the shellfish by weight. The total body mass equals meat plus water plus perhaps a few percent shell and other structure.

In FIG. 1, a pair of position sensors 50, 52 lie in the ends of a holder base, to sense the separation of the horns 30, 32, to thereby detect the separation between the locations 40, 42 where acoustic energy is applied and detected. The first circuit 34, generates a signal Dclaw on line 60 which represents the distance that the acoustic energy passed when passing through the part of the shellfish. The first circuit also delivers a signal Tclaw on line 62 which indicates the time period required for sound to pass through the part of the shellfish between the locations 40, 42. A second circuit 64 receives the two signals on lines 60, 62 respectively representing the distance that the sound traveled within the seafood animal part and the time of transit of the acoustic energy through the part, and generates a signal on output line 66 which represents the velocity of sound through the seafood animal part.

Figure 2:
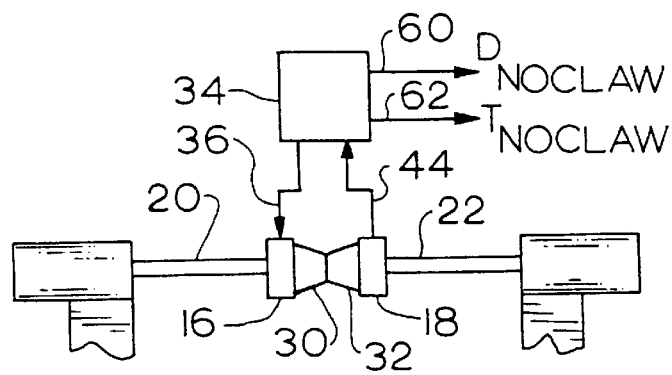
FIG. 2 is a view of a portion of the apparatus of FIG. 1, showing the apparatus being calibrated.

FIG. 2 illustrates the apparatus of FIG. 1 during a calibration process. The rods 20, 22 are moved towards each other until the horns 30, 32 abut one another. Then, the first circuit 34 transmits an energizing signal through line 36 to the first transducer 16 to energize it, and detects the output on line 44 from the second transducer. The outputs Dnoclaw and Tnoclaw on lines 60 and 62 now represent the distance between the ends of the two horns 30, 32 when they touched, and the period of time for sound to pass between the transducers when the horns touch. The actual velocity of acoustic energy through the claw equals the difference between the distance Dclaw when the lobster claw was present minus Dnoclaw when no lobster claw was present, divided by the difference between Tclaw when a claw was present minus Tnoclaw when no claw was present. Small changes in velocity can arise due to changes in temperature or aging of the equipment, and such small changes have a large effect on evaluation. This is because only a 6% change in sound velocity (1660 m/sec. to 1560 m/sec.) represents a 63% change in MC (19% to 7%).

Applicant has determined through numerous tests, that there is a close correlation between the velocity of sound through a part of a lobster or crab, and the percent of meat to meat plus water of the lobster or crab. An MC (meat content) ratio of at least about 19% indicates that the lobster or crab will remain alive for several days during shipment to markets or restaurants, and that the shellfish will "taste good" when eaten. Applicant's test also show that if the meat ratio is less than about 7%, that the lobster or crab is probably molting or is diseased, and in either case, the animal will not "taste good" after being shipped for several days and then eaten. A meat ratio of about 12% (11% to 13%) may be used as a borderline, with animals having a ratio less than this not harvested and those with a higher ratio being harvested. For those animals with a high ratio (e.g. at least 14%), a premium price may be charged. Previously, evaluations were based on the color, weight, and other external characteristics of the lobster that did not involve probing inside the live lobster. A more accurate and more objective evaluation of the shellfish is highly desirable.

Figure 3:
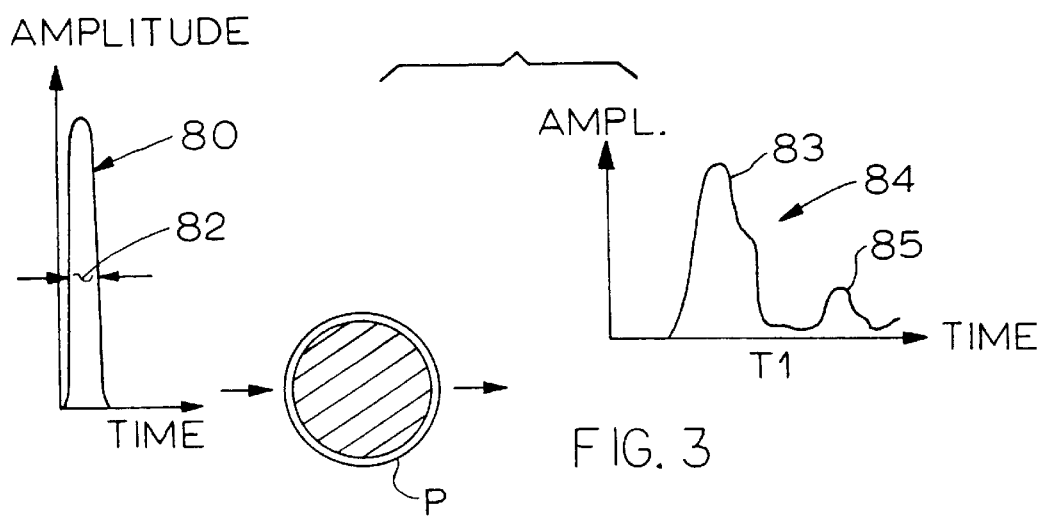
FIG. 3 is a sectional view of the lobster claw of FIG. 1 and of two graphs, including a graph showing amplitude versus time characteristics of acoustic energy delivered to a location at one side of the lobster claw, and the amplitude versus time characteristics of acoustic energy detected at an opposite side location of the lobster claw.

FIG. 3 illustrates a method for evaluating the condition of a lobster or crab. In FIG. 3, the graph 80 represents the characteristic of a pulse of current that drives the first transducer (16 in FIG. 1). The pulse may be of short duration 82 such as one-fifth microsecond, which results in ultrasonic acoustic energy being transmitted through the animal part by a transducer with fast reaction time. The predominant frequency transmitted is at 5 MHz. Graph 84 represents the output of the second transducer (18 in FIG. 1) showing the variation in amplitude with time. Graph part 83 represents the direct travel of sound through the animal part to the second transducer, while part 85 represents a reflection.

Figure 4:
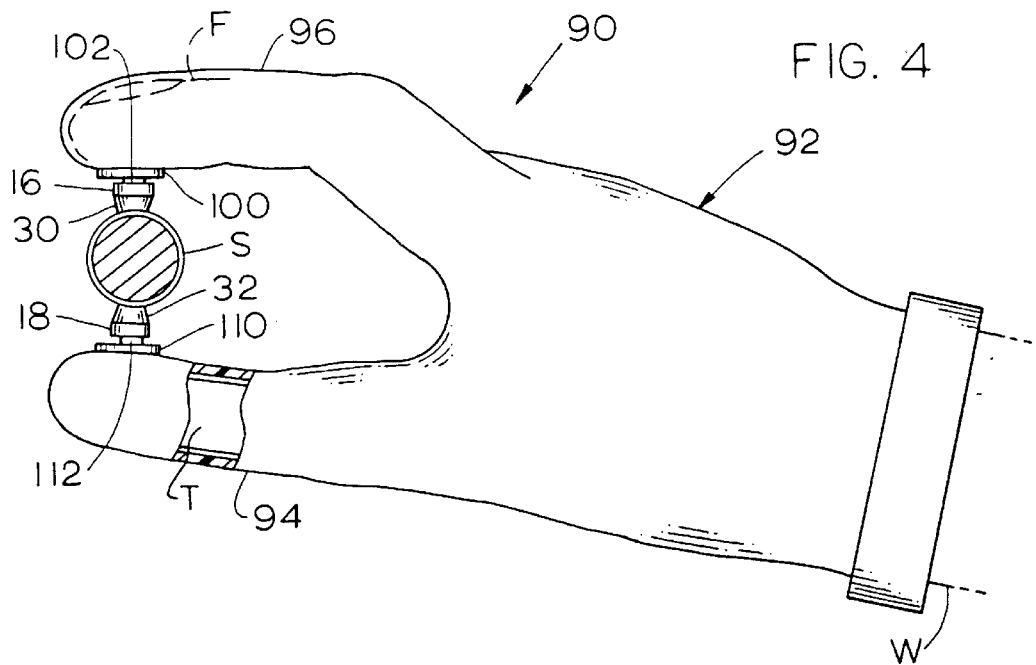
FIG. 4 is a side elevation view of a glove of a second embodiment of the invention, for rapidly passing acoustic energy through a lobster claw.

FIG. 4 shows an apparatus 90 that facilitates coupling the transducers 16, 18 to the shellfish S such as a lobster or crab. The apparatus includes a glove 92 with a thumb sleeve 94 for receiving the thumb T of the wearer, and a finger sleeve 96 for receiving an opposed finger F of the wearer such as the index or middle finger. The finger sleeve 96 holds a mount 100 on which the first transducer 12 is mounted, through a dampener 102, and with a horn 30 mounted on the transducer. The thumb sleeve 94 is similar constructed, with a mount 110, dampener 112, and horn 32. The wearer W can grasp the part S of the shellfish and immediately cause sonic energy to pass between the transducers 12, 14 by way of the part, to produce the evaluations described above. Preferably a pressure sensor senses when the wearer has pressed the animal part between his thumb and opposed finger with a predetermined force such as one-quarter kilogram (one-half pound), to then automatically activate the circuit that energizes the first transducer 12 and to set the circuits that evaluate the output from the second transducer 14. The worker may be holding the seafood animal with his other hand when he grasps the part with the glove. The sleeves do not have to cover the entire thumb or other finger but only hold themselves in place. A distance measuring device such as a cylinder and piston extending between the two sleeves beside the lobster claw, measures distance.

Figure 5:
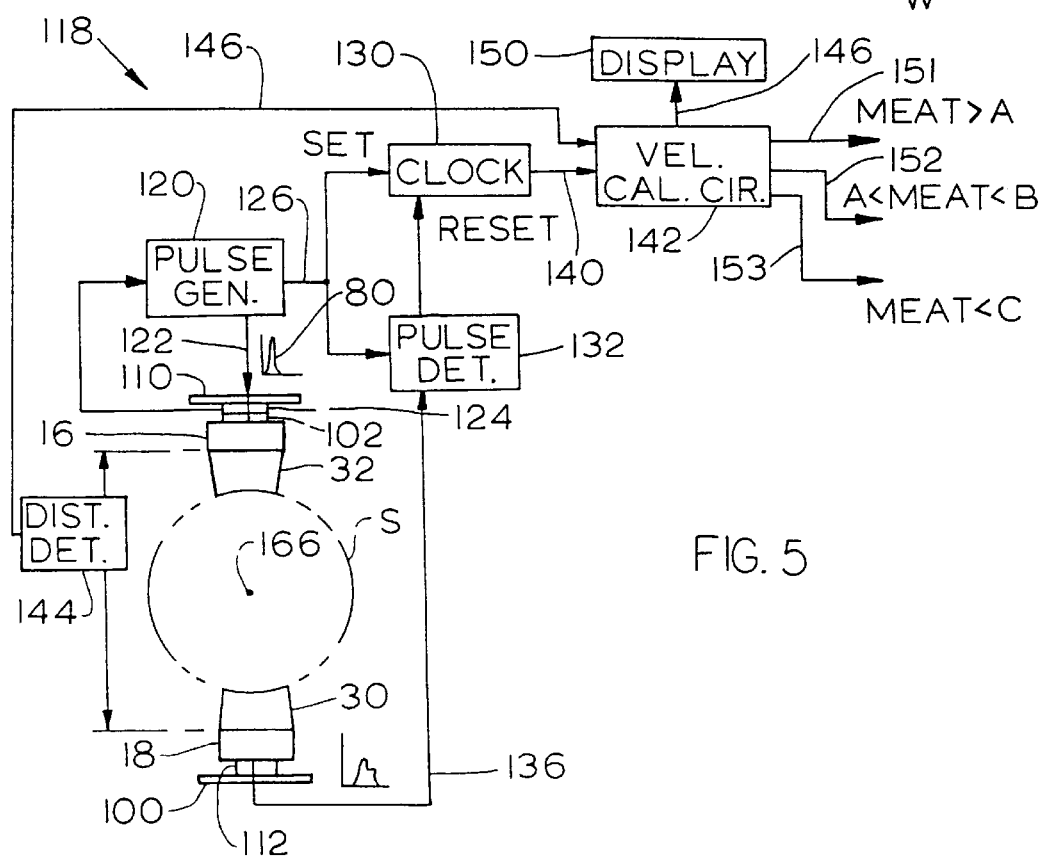
FIG. 5 is a block diagram showing circuitry for generating signals representing the quality of lobster claw meat, or the ratio of meat to meat plus water, by measuring the velocity of acoustic energy through the lobster claw.

FIG. 5 is a block diagram showing circuitry 118 for operating the transducers of FIG. 5. A pulse generator 120 generates a pulse indicated at 80 on line 122, which energizes the transducer 16 to generate acoustic energy that is passed through the seafood animal part S to the detecting transducer 18. While the worker could operate a pedal or other switch, applicant prefers to provide a pressure sensor 124 which senses the force with which the transducers are pressed toward the animal part S. When the force increases pass a predetermined level such as one-quarter kilogram (one-half pound), the pressure sensor 124 automatically activates the pulse generator 120 to generate the pulse 80 and begin processing of detected signals. A portion of the pulse or a signal representing the beginning of the pulse, is transmitted over line 126 to a clock 130 to set it and to set a pulse detector 132. The force generally should not exceed about one-half kilogram to avoid the danger of cracking the shell.

During a period such as 200 microseconds when the second transducer 18 detects the ultrasonic energy, the output of the transducer 18 is delivered through line 136 to the pulse detector 132, which detects the leading edge of the pulse and which sends a signal to the clock to reset it. By subtracting the time between the setting and resetting of the clock, a signal over line 140 representing the time required for the transit of the pulse is delivered to a velocity calculating circuit 142. The circuit 142 will have earlier received a signal representing the sound transit time with the horns touching one another. The difference between these time indicates the time for sonic energy to pass only through the animal part. A distance detector 144 detects the distance between the transducers. The output of the distance detector on line 146 is delivered to the velocity calculating circuit 142. The distance during calibration has previously been delivered to the circuit 142. The circuit can calculate the distance through the animal part as a difference in the detected distance when no animal part was present and when the animal part is present. That is, circuit 142 can obtain the difference in distance (between calibration and presence of the shellfish) and divide that by the difference in time periods (between the time during calibration and the time during presence of the animal) and deliver a signal on line 146 to a display 150. The display 150 can display the velocity of sound through the animal part, or display the ratio of meat to total body mass.

The circuit 142 also has three outputs 151, 152, 153 which indicate whether the meat ratio MC is acceptable for harvesting the animal and shipping it to a market. If the meat content MC is greater than a predetermined level such as 13%, then the signal 151 is generated, which may sound a high pitch sound indicating to the person holding the shellfish that the shellfish is probably acceptable for shipment. If the percent meat is less than a predetermined level C such as 11%, then the signal on line 153 may generate a low pitch sound indicating that the part is unacceptable for shipment. If the velocity is between levels A and B, such as 11% to 13%, then a signal on line 152 may energize a buzzer of moderate pitch to indicate this to the person making the evaluation, who then may ask an experienced person to evaluate the shellfish. Of course, signals such as green, yellow, and red lights can be used.

A piezoelectric transducer used at 16 is sensitive to a limited band of frequencies. The particular transducer 16 that is used is most sensitive to the primary frequency (5 MHz) of the pulse 80 applied to the first side of the shellfish, and therefore acts as a filter to pass only that frequency.

Applicant prefers to apply ultrasonic energy of a frequency less than 10 MHz. Attenuation generally increases with frequency, so at high frequencies such as above 10 MHz the output of the receiver transducers are very low and partially masked by noise. Applicant prefers to use frequencies of at least about 1 MHz so that directly transmitted sound can be readily distinguished from sound that was internally reflected. Also, the high frequency helps the transducer device, including the horn 30, direct the sound in a beam with minimum spread so a maximum percent reaches the transducer 18.

In tests on lobsters, applicant found that it is best to apply the transducers to the crusher claw of a lobster. The tail is of a more complicated construction than the claws, resulting in more difficulty in analyzing and less consistent results. Applicant found that either the pincer claw or crusher claw of the lobster could be tested with reliable results, but found greater reproducibility when the crusher claw was used.

In the lobster industry, the quality of a lobster is often given by the term "Meat Content" or "MC", where MC equals the weight of the meat divided by the combination of weight of meat plus weight of fluids. The weight of the shell and other rigid structure is minimal and is ignored. MC can be determined by weighing a lobster and then freeze drying it to get rid of fluids and again weighing it. The difference before and after freeze drying is the weight of fluid. Then, the meat is scooped out to obtain the weight of meat.

Figure 6:
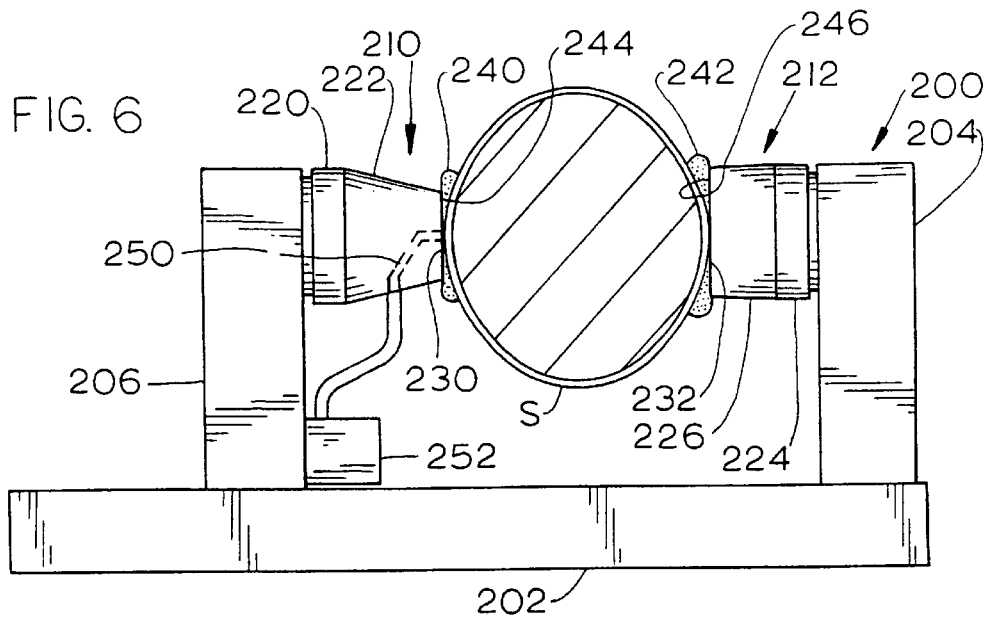
FIG. 6 is a front elevation view of apparatus of another embodiment of the invention.

FIG. 6 illustrates another apparatus 200 that applicant has developed to determine the meat content of a shellfish, and particularly a lobster or crab. The apparatus includes a base 202, a fixed arm 204, and a movable arm 206 that can slide toward and away from the fixed arm. Transducer devices 210, 212 are mounted on the arms. The first transducer device 210 includes a transducer 220 which is energized to generate pulses of acoustic energy and a horn 222. The second transducer device 212 includes a receiving transducer 224 and a receiving horn 226.

The transmitting horn, or solid transmission line 222 serves as a medium to conduct the acoustic energy to the shell. It also provides a time delay so that the entire pulse can leave the transducer before any reflected energy reaches the transmitting transducer. The horns cannot be pressed with a large force against the shell opposite sides for good acoustic coupling, or else the shell will crack. To enable good acoustic coupling, applicant applies quantities 240, 242 of a sound-transmitting gel such as ECOGEL 200 manufactured by Eco-Med Pharmaceuticals, which is water soluble and has a specific gravity of 0.97 to 1.0. The gel is applied between the face 244, 246 of each transducer device and the shellfish. Applicant prefers to construct the horns with at least one passage 250 for dispensing the gel from a source 252 prior to pressing the transducer devices against the shellfish.

Figure 7:
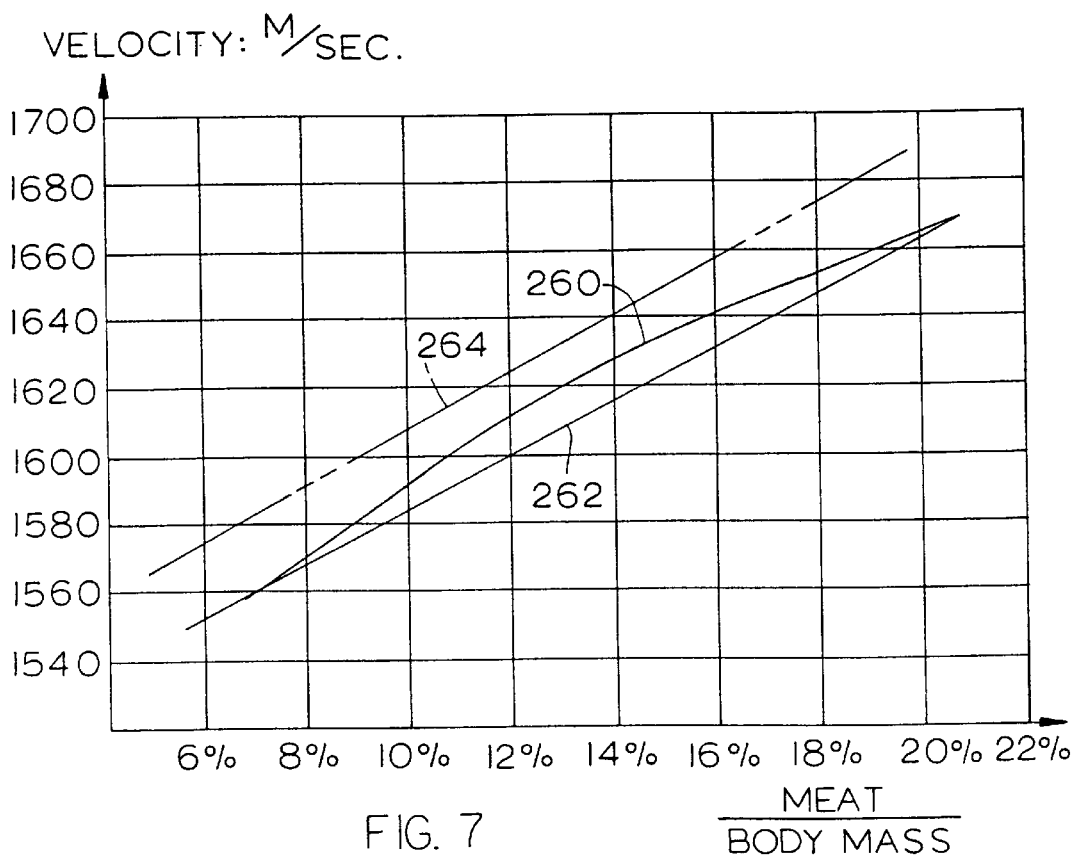
FIG. 7 is a graph showing variation in the ratio meat to body mass for lobsters and crabs as determined by multiple tests by applicant.

FIG. 7 contains a graph 260 showing the relationship between velocity of sound passed through a lobster claw and MC, or meat content (ratio of meat to meat plus water) of the shellfish based on one-hundred twenty-five sonic measurements confirmed by freeze dry measurements. These measurements were taken for a water temperature of about 5° to 10° Centigrade and against the crusher claw of live lobsters. The relationship of graph 260 is close to linear, and shows that at a sound velocity of 1660 m/sec. the meat content is 19%, while at a velocity of 1560 the meat content is 7%. As mentioned above, a meat content of at least about 12% indicates that the lobster or crab can be harvested, that is, shipped to a market or restaurant and result in a "good taste". In at least three-quarters, or 75% of the cases, the lobster with close to 19% meat content (at least 18%) will be harvested. A lobster or crab with a meat content of about 7% (7% to 8%) indicates that the animal is molting or is diseased, and such animals will not be shipped for consumption. Generally, a lobster or crab with a meat content of at least about 12% will be harvested, while a lobster or crab with a meat content of less than about 12% generally will not be shipped for consumption. The graph 260 can be approximated by graph 262 wherein:

$$MC=(V-K)/7.9$$

where MC is the percent meat to meat plus water, V is the measured velocity of sound through a part of the animal, and K is a constant between about 1500 m/sec. (for the graph 262) and about 1525 m/sec. (for the graph 264), or about 1512 (1480 to 1545) m/sec.

Thus, the invention provides a method and apparatus for determining the meat content of a shellfish, and especially a lobster or crab, by passing acoustic energy through the animal and measuring the velocity of sound through the shellfish. In order to pass the sound through the shellfish, a pair of transducers are moved towards opposite sides of the shellfish and pressed against the opposite sides. However, the transducer devices are pressed with a force that does not deform (more than about 5%) or crack the shell. Without a gel, only a weak signal will be transmitted. However, applicant establishes a sound-carrying flowable material, especially one in the form of a gel, between the face of each transducer device and a corresponding location on the shell. The apparatus is calibrated at the start of each day, and preferably before the evaluation of each shellfish so a plurality of calibrations are performed each day. This is accomplished by moving the faces of the transducer devices against one another and measuring the time period for sound to pass from one transducer to the other. This time period is subtracted from the period required for sound to pass through a shellfish, to determine the period of time required for sound to pass only through the shellfish. At least 75% of the time, a shellfish is harvested when the velocity of sound through it is at least 1660 meters per second, and at least 75% of the time a shell fish is not harvested when the sound through it is no more than 1560 meters per second.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for evaluating a live shellfish, comprising:
   passing sound between first and second locations at opposite sides of the shell of the live shellfish, and determining the velocity of sound between said locations;
   said step of passing sound includes pressing a pair of transducer devices against said locations without substantially deforming or cracking the shell.

2. The method described in claim 1 wherein:
   said transducer devices each has a face, and including establishing a sound-carrying flowable material between the face of each transducer device and a corresponding one of said locations on said shell.

3. The method described in claim 1 wherein:
   said transducer devices each has a face, and including applying a sound-carrying gel to each of said faces before pressing said faces against said shell locations.

4. The method described in claim 1 wherein:
   said transducer devices each has a transducer and a face, with a first of said transducers being energizeable to generate sound and the second transducer generating an electrical signal when it detects sound;
   moving said faces toward each other until said faces are engaged with each other, energizing said first transducer and detecting sound received by said second transducer, and recording a signal representing an initial time period for the passage of sound between said transducers;
   moving said faces against opposite sides of a live shellfish, energizing said first transducer and detecting sound received by said second transducer, recording a second time period for the passage of sound between said transducers, and measuring the change in separation of said devices between the time of said initial time period and the time of said second time period;
   generating a signal representing the velocity of sound through said shellfish by the difference in separation of said devices divided by the difference between said second and first time periods.

5. The method described in claim 1 wherein:
   said shellfish consists of lobsters and crabs;
   at least 75% of the time, harvesting the shellfish for transport and human consumption when the velocity of sound through the shellfish is at least 1660 meters per second and not harvesting the shellfish for human consumption when the velocity of sound through the shellfish is no more than 1560 meters per second.

6. The method described in claim 1 wherein:
   said shellfish is a lobster that has a crusher claw, and said step of passing sound between locations includes passing sound between opposite sides of said crusher claw, including pressing said transducer devices against said crusher claw with a force of no more than one-half kilogram.

7. The method describe in claim 1 including:
   a majority of the time, harvesting the shellfish for human consumption when the velocity of sound through the shellfish is at least 1600 meters per second, and not harvesting the shellfish for human consumption when the velocity of sound through the shellfish is less than 1600 meters per second.

8. The method described in claim 1 including:
   said shellfish consists of lobsters, and including indicating the Meat Content MC approximately according to the equation:

$$MC = V - K/7.9$$

where V is said velocity in m/sec. and K is equal to about 1512 m/sec.

9. The method described in claim 1 wherein:
   said step in passing sound includes directing a pulse of acoustic energy having a duration between one-quarter microsecond and ten microseconds into said shellfish.

10. A method for assessing the condition of a live shellfish comprising:
    pressing rigid faces of first and second transducer devices toward each other and against locations at opposite sides of the shell of a live shellfish while passing sound between said locations and determining the velocity of sound through the shellfish between said locations;
    said step of pressing including pressing without deforming the shell more than about 5% of an undeformed shell width, but while a sound-passing gel lies between each of said device faces and the shell.

11. The method described in claim 10 including:
    moving said devices toward each other so their faces engage each other, and operating a circuit to energize said first device and record a signal representing an initial time period for the passage of sound between said devices;
    moving said devices apart and then performing said step of moving the faces against opposite sides of a live shellfish, and operating said circuit to energize said first device and record a second time period for the passage of sound between said devices, and
    generating a signal representing the velocity of sound through said shellfish by the separation of said faces when they lay against the shellfish divided by a quantity equal to said second time period minus said initial time period.

12. The method described in claim 10 including:
    dispensing said flowable fluid against said faces through apertures in said faces.

13. Apparatus for use in determining the likelihood that a live shellfish which is a lobster or crab is unsuitable for harvesting or is suitable for harvesting, comprising:
    a first transducer for generating acoustic energy, a second transducer for detecting acoustic energy and for generating electrical signals representing the detected acoustic energy, and means for coupling said transducers to spaced locations on said shellfish to transmit acoustic energy between said transducers through the shellfish;

a distance sensor which is coupled to said transducers and which generates a signal representing the distance between said spaced locations;

a circuit coupled to said transducers including a velocity-calculating circuit portion that is coupled to said transducers and to said distance sensor and which generates a signal representing the velocity of said acoustic energy passed through said shellfish between said spaced locations;

said circuit being constructed to generate a first signal that indicates that the shellfish is unacceptable for harvesting at least when the average velocity of sound between said transducer is below about 1600 meters per second, and which generates a second signal that indicates that the shellfish is acceptable for harvesting at least when the average velocity of sound between said transducer is above about 1600 meters per second.

14. The apparatus described in claim 13 wherein:

said means for coupling said transducers, each includes a rigid face and a sound-passing gel lying on each of said faces, so sound can pass between each face and the shellfish without deforming the shellfish.

15. The apparatus described in claim 13 wherein:

said circuit is constructed to generate electrical signals in pulses each of a duration of between one microsecond and ten microseconds and energize one of said transducers with the pulses at intervals of at least 200 microseconds.

16. Apparatus for evaluating the condition of a live shellfish, which includes a first transducer device for generating acoustic energy and a second transducer device for detecting acoustic energy, said devices each having a face for substantially engaging the shellfish, and a circuit coupled to said devices for generating a signal indicating a characteristic of acoustic energy passed through the shellfish, comprising:

a quantity of sonic coupling gel that lies between and against the face of each of said devices and the shell of the shellfish, to thereby acoustically couple each device face to the shell without damage to the shell.

17. Apparatus for evaluating the condition of a live shellfish, which includes a first device for generating acoustic energy and a second device for detecting acoustic energy, said first device having an electrically energized first transducer that generates sound and said second device having a second transducer that generates an electrical signal representing detected sound, said devices each having a face for substantially engaging the shellfish, and said apparatus including a circuit coupled to said devices for determining the time required for sound to pass between said device faces by way of a shellfish to determine the velocity of acoustic energy passed through the shellfish, comprising:

a transducer holder that holds both of said transducer devices with said faces facing each other at variable distances apart, said transducer holder being constructed to move said transducer device faces into direct contact with each other;

said circuit is constructed to calibrate itself by determining an initial period of time between energization of said first transducer and detection by said second transducer when said device faces are in direct contact, and to subtract this initial period of time from the period of time required for sound to pass between said transducers when said device faces engage a shellfish.

* * * * *